United States Patent
Castellanos et al.

(10) Patent No.: US 8,423,396 B1
(45) Date of Patent: Apr. 16, 2013

(54) SYSTEM AND METHOD FOR PROCESS DISCOVERY

(75) Inventors: Maria Guadalupe Castellanos, Sunnyvale, CA (US); Fabio Casati, Menlo Park, CA (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2933 days.

(21) Appl. No.: 11/116,862

(22) Filed: Apr. 28, 2005

(51) Int. Cl.
*G06Q 10/00* (2012.01)

(52) U.S. Cl.
USPC ............................................. 705/7.27

(58) Field of Classification Search ............ 705/7.27
See application file for complete search history.

(56) References Cited

U.S. PATENT DOCUMENTS

| | | | |
|---|---|---|---|
| 5,276,870 A | 1/1994 | Shan et al. | |
| 5,325,525 A | 6/1994 | Shan et al. | |
| 5,412,806 A | 5/1995 | Du et al. | |
| 5,546,571 A | 8/1996 | Shan et al. | |
| 5,694,591 A | 12/1997 | Du et al. | |
| 5,826,239 A | 10/1998 | Du et al. | |
| 5,870,545 A | 2/1999 | Davis et al. | |
| 5,937,388 A | 8/1999 | Davis et al. | |
| 6,023,571 A * | 2/2000 | Matsumoto et al. | 703/2 |
| 6,041,306 A | 3/2000 | Du et al. | |
| 6,078,982 A | 6/2000 | Du et al. | |
| 6,308,163 B1 | 10/2001 | Du et al. | |
| 6,728,932 B1 | 4/2004 | Chundi et al. | |
| 2002/0138316 A1 | 9/2002 | Katz et al. | |
| 2002/0161823 A1 | 10/2002 | Casati et al. | |
| 2002/0170035 A1 | 11/2002 | Casati et al. | |
| 2002/0174093 A1 | 11/2002 | Casati et al. | |
| 2002/0194257 A1 | 12/2002 | Casati et al. | |
| 2003/0018694 A1 | 1/2003 | Chen et al. | |
| 2003/0023450 A1 | 1/2003 | Casati et al. | |
| 2003/0028389 A1 | 2/2003 | Casati et al. | |
| 2003/0083910 A1 | 5/2003 | Sayal et al. | |
| 2003/0084142 A1 | 5/2003 | Casati et al. | |
| 2003/0120530 A1 | 6/2003 | Casati et al. | |
| 2003/0144860 A1 | 7/2003 | Casati et al. | |
| 2003/0149604 A1 | 8/2003 | Casati et al. | |
| 2003/0149714 A1 | 8/2003 | Casati et al. | |
| 2003/0153994 A1 | 8/2003 | Jin et al. | |
| 2003/0154154 A1 | 8/2003 | Sayal et al. | |
| 2003/0191679 A1 | 10/2003 | Casati et al. | |
| 2003/0212569 A1 | 11/2003 | Casati et al. | |
| 2003/0225604 A1 | 12/2003 | Casati et al. | |
| 2003/0225644 A1 | 12/2003 | Casati et al. | |
| 2003/0233273 A1 | 12/2003 | Jin et al. | |
| 2003/0236659 A1 | 12/2003 | Castellanos | |

(Continued)

OTHER PUBLICATIONS

Jonathan E. Cook and Alexander L. Wolf, Automating Process Discovery through Event-Data Analysis, 1995, Association of Computing Machinery, p. 73-82.*

(Continued)

*Primary Examiner* — Andre Boyce

(57) ABSTRACT

Embodiments of the present invention relate to a system and method for process discovery. Specifically, embodiments of the present invention relate to defining a trace using process data, the trace comprising a collection of events, analyzing the trace to detect nodes and arcs between the nodes using relationships between the collection of events, and detecting interleaving in the arcs by analyzing relationships between the collection of events and the detected nodes and arcs.

35 Claims, 5 Drawing Sheets

U.S. PATENT DOCUMENTS

| | | |
|---|---|---|
| 2003/0236677 A1 | 12/2003 | Casati et al. |
| 2003/0236689 A1 | 12/2003 | Casati et al. |
| 2003/0236691 A1 | 12/2003 | Casati et al. |
| 2004/0015378 A1 | 1/2004 | Casati et al. |
| 2004/0044636 A1 | 3/2004 | Casati et al. |
| 2004/0103076 A1 | 5/2004 | Casati et al. |
| 2004/0103186 A1 | 5/2004 | Casati et al. |
| 2004/0153329 A1 | 8/2004 | Casati et al. |
| 2004/0187089 A1* | 9/2004 | Schulz .................. 717/101 |
| 2004/0199517 A1 | 10/2004 | Casati et al. |
| 2004/0205187 A1 | 10/2004 | Sayal et al. |

OTHER PUBLICATIONS

Workflow Patterns; W.M.P. van der Aalst, A.H.M. ter Hofstede, B. Kiepuszewski, and A.P. Barros; pp. 1-70.

* cited by examiner

SYSTEM AND METHOD FOR PROCESS DISCOVERY

BACKGROUND

This section is intended to introduce the reader to various aspects of art, which are related to various aspects of the present invention described and claimed below. This discussion is believed to be helpful in providing the reader with background information to facilitate a better understanding of various aspects of the present invention. Accordingly, it should be understood that these statements are to be read in this light and not as admissions of prior art.

Business processes within or across an enterprise are often partially or totally automated. This automation can be provided by many different systems. For example, relevant systems include legacy applications, such as an Enterprise Resource Planning ("ERP") system, and more modern custom applications, such as Java language applications, Web applications, and workflow applications. These systems can be heterogeneous, distributed, and independently managed by different entities of an organization or enterprise. This decentralization and distribution often makes it difficult to obtain a coherent picture of what processes are actually being performed across an enterprise.

BRIEF DESCRIPTION OF THE DRAWINGS

Advantages of one or more disclosed embodiments will become apparent upon reading the following detailed description and upon reference to the drawings in which.

DETAILED DESCRIPTION

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation specific goals, such as compliance with system-related and business-related constraints, can vary from one implementation to another. Moreover, it should be appreciated that such a development effort can be complex and time consuming but remain a routine understanding of design, fabrication, and manufacture for those of ordinary skill having the benefit of this disclosure.

Embodiments of the present invention relate to process discovery. The term process discovery refers to the extraction of a process model from events, messages, or other data collected by computer systems. Embodiments of the present invention enable process discovery by extracting a process model from a database or log file of events corresponding to execution of operations by one or more applications. Indeed, in accordance with embodiments of the present invention, process discovery includes discovery of complex process models (i.e., models that are more than merely sequential or loop-free). Additionally, embodiments of the present invention are adapted for use with operations that are more than instantaneous (e.g., operations characterized by both a start time and stop time). This can be beneficial when working with typical business operations in view of their protracted nature.

An extracted process model in accordance with embodiments of the present invention assists in obtaining a coherent picture of what processes are actually being performed across an enterprise. Such a model can be utilized to assist an enterprise in gaining a better understanding of its own business operations, thus facilitating improvement of those business operations. For example, having a process model simplifies fully automating business processes. Indeed, understanding certain processes in an enterprise can simplify the deployment of process monitoring tools, which can be used to make process improvements and increase efficiency. One embodiment of the present invention includes a system that monitors business processes and links the business processes to Information Technology ("IT") resources. It should be noted that model extraction in accordance with embodiments of the present invention is achieved with few assumptions regarding the execution environment, allowing for application to a variety of platforms and processes.

Figure 1:
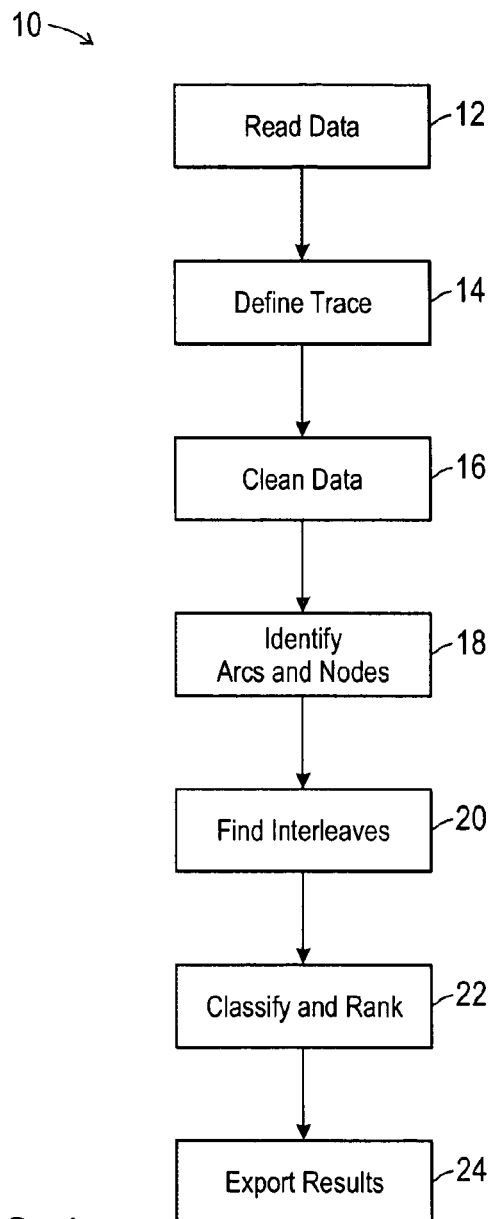
FIG. 1 is a flowchart of an exemplary method for process discovery illustrating one embodiment of the present invention.

FIG. 1 is a flowchart of an exemplary method for process discovery illustrating one embodiment of the present invention. The method is generally referred to by reference number 10. The first step in method 10, as represented by block 12, includes reading process data relating to certain steps, nodes or tasks of a process, which are herein defined as equivalent terms. For example, in one embodiment, process data is extracted by reading business process data from a database or log file. Specifically, in one embodiment, a data warehouse receives log files or database files from a plurality of systems distributed across an enterprise or network. These systems include, but are not limited to, web servers, application servers, ERP systems, message brokers, or other business process management and monitoring systems.

The log file or database is stored in a storage medium and comprises a series of time stamps that correspond to events. In one embodiment, time stamps correspond to times at which a plurality of business process steps were either started or stopped. For example, in one embodiment, an entry in a log file contains a start time and a completion time for one task in an order fulfillment process. Additionally, in one embodiment, the database or log file includes information about the context in which a particular process step was performed and information relating to identification of the step. For example, an entry in a log file can contain information that indicates that an "approval" step was started at 3:30 PM and completed at 4:15 PM, and that it was executed in the context of a particular business process (e.g., a specific expense reimbursement request).

As set forth above, an entry in a log file contains information regarding the start time, stop time, and context of steps or tasks in a process. For example, the log file can include the start times and end times for a set (S) of business tasks (T), where $S=\{T_1, T_2, \ldots, T_n\}$. Specifically, for a particular task, $T_i$, the log file can include a start time ($T_i^s$) and end or stop time ($T_i^e$). The start and stop times for each of the tasks are referred to as events (i.e., the start or end of a particular task). Specifically, $T_i^s$ indicates the time instance where $T_i$ begins and $T_i^e$ indicates the time instance where $T_i$ ends. For example, in one embodiment, the set $S=\{T_1, T_2, \ldots, T_n\}$ includes tasks or steps in a customer order process and $T_i^s$ and $T_i^e$ comprise the start and completion times for steps in the process. Specifically, for example, the time that a purchase order is received indicates the start ($T_1^s$) of an order entry task ($T_1$) in the customer order process, and the time of entry of the purchase order into a database indicates the end ($T_1^e$) of the order entry task ($T_1$).

Once the business process data has been read from the log file or database, the process 10 continues by defining a trace or set of traces (e.g., a trace table), as indicated in block 14. In one embodiment, relevant information is extracted (block 12) and a trace is created using computer software, such as a set of Structured Query Language ("SQL") scripts. A trace includes a collection of events corresponding to a particular process execution. For example, in one embodiment, a trace comprises a sequence of events that a customer order goes through during an order fulfillment process. Further, in one embodiment, the events in the trace are partially ordered by time. For example, the sequence $T_3^s T_2^s T_2^e T_3^e T_1^s T_1^e$ is a trace, where $T_3^s \leq T_2^s \leq T_2^e \leq T_3^e \leq T_1^s \leq T_1^e$. Again, the postfixes $^s$ and $^e$ denote the start and completion of tasks $T_i$.

As illustrated by block 16, after the traces have been created, the imported data is cleaned in accordance with embodiments of the present invention. For example, in one embodiment, spurious occurrences in the data are removed. In one embodiment, cleaning the data in block 16 includes removing data relating to processes for which the data is incomplete. For example, data relating to the start of a node (i.e., the beginning of a task) is removed when data relating to the completion of the node is not available. Similarly, data entries for which information is missing are removed in accordance with embodiments of the present invention. For example, when a node completion time is available but the start time for the node is missing, the entry is removed. Further, in one embodiment of the present invention, data cleaning (block 16) includes removing or revising outlying data that is clearly incorrect (e.g., data indicating a start time that remains in the future). The data cleaning represented by block 16 is achieved in accordance with embodiments of the present invention by, for example, an algorithm adapted to detect outlying data, incomplete data, and data with missing information.

After the data is cleaned as discussed above, method 10 proceeds to retrieve information about nodes (i.e., tasks) in the process and store the information in memory, as illustrated by block 18. Specifically, in accordance with embodiments of the present invention, block 18 represents identifying arcs that exist between nodes. An arc is a relationship that is identified as existing between two nodes A and B if in a large percentage of traces B is present when A is present and the completion of A precedes the start of B (e.g., $A^e$ precedes $B^s$ in a large percentage of traces). It should be noted that it is possible for an arc to exist between nodes A and B even when other events occur between $A^e$ and $B^s$. In essence, it can be stated that $Pr(A^e * B^s | B^s) > T1$, where T1 is a threshold close to one (e.g., a value set at 0.9).

In accordance with embodiments of the present invention, arc information retrieved in block 18 also includes a number of instances (i.e., traces) in which a fragment $X^e * B^s$ is found, where X represents different nodes. Additionally, in some embodiments of the present invention, the arc information retrieved in block 18 includes the average as well as standard deviation of the time difference between $X^e$ and $B^s$.

Detection of an arc in block 18 is inconclusive regarding whether a corresponding arc will be present in a discovered process. For example, the procedures of block 18 can retrieve many more arcs than those that actually exist in a particular discovered process. Remaining portions of the method 10 progressively refine the discovered arcs or remove excess arcs (e.g., arcs detected in this preliminary phase but not actually present in the process) until all or substantially all of the arcs remaining correspond to actual dependencies among nodes in the process. In one embodiment, arcs that have $Pr(A^e * B^s | B^s) > T1$ but for which there are few occurrences (e.g., less than a user defined threshold value, $T_{occ}$) are removed from consideration. Additionally, in one embodiment, each arc is assigned an existence probability (e.g., a value of 0.5). The existence probability is an indication of whether the arc corresponds to an actual execution dependency between the source and destination node of the arc (i.e., it corresponds to an actual arc in a process graph).

Block 20 represents finding interleaves. Specifically, this portion of method 10 includes endowing arc information with information about interleaving events. These interleaving events include start and completion events that occur between the source and destination nodes of the arc (e.g., between $A^e$ and $B^s$). In one embodiment, for a particular node N, a derivation is performed to determine how many times a start event for node N interleaves with an arc, how many times the end event interleaves with the arc, how many times both the start event and end event interleave with the arc, and how many times zero events interleave with the arc. This can be performed for multiple nodes. Further, statistics are recorded relating to the different types of interleaving that are determined. For example, such statistics include average and standard deviation of the time difference between the events.

Block 22 represents classifying and ranking arcs, which will be discussed in further detail with regard to FIG. 2. Generally, block 22 represents analyzing the detected arcs and ranking them based on certain characteristics. For example, in one embodiment, arcs are arranged according to corresponding probabilities that the arcs actually exist in a discovered process. Additionally, in accordance with embodiments of the present invention, block 22 represents classifying the arcs. For example, in one embodiment, a classification determines whether the relationship between two nodes is one of various process structures (e.g., a sequence, a split, or a join), which are discussed in further detail below. Further, in one embodiment, the arcs are organized according to their identified classification.

Some basic process models that are exemplary of process structures can be discovered using embodiments of the present invention. Process structures correspond to ordering constraints among tasks that appear frequently in many process models. By discovering process structures from traces, it is possible to combine them and obtain a comprehensive process model discovered from the traces. Those skilled in the art will appreciate the process structures described below are merely exemplary process structures and are not intended to be exclusive. In alternate embodiments of the invention, other process structures can be discovered.

There are three basic constructs of process structures sought for discovery from transaction logs in accordance with embodiments of the present invention. As discussed above, these process structures are used to classify relationships found between nodes. One example of a process structure is referred to as a "sequence." In a sequence, a task Y is enabled in a process structure after completion of another task X. In such a case, there exists a directed link in a graphical representation from X to Y. The relationship between X and Y in such a case can be referred to as a direct relationship.

Another example of a process structure is a referred to as a "split." In a split, a single thread of process flow splits into multiple branches. For example, a split process structure includes a task X that diverges into tasks $Y_1, Y_2, \ldots, Y_n$. In other words, there are n directed links from X to $Y_1, Y_2, \ldots,$ $Y_n$, respectively. Two types of splits are recognized in accordance with embodiments of the present invention: an XOR-Split and an AND-Split. In an XOR-Split, one of the branches is chosen to execute based on a decision. The XOR-Split is denoted by XOR-Split(X; $Y_1, Y_2, \ldots, Y_n$). In an AND-Split, the branches are executed in parallel (e.g., the tasks are conducted simultaneously). It should be noted that such execution can occur in any given order. The AND-Split is denoted by AND-Split (X; $Y_1, Y_2, \ldots, Y_n$).

Yet another example of a process structure is a join. In a join, multiple process branches merge into a single process flow. For example, the tasks $X_1, X_2, \ldots, X_n$ joining into task Y represent a join process structure. Similar to the split, two types of joins are recognized in accordance with embodiments of the present invention: an XOR-Join and an AND-Join. In an XOR-Join, one of the branches merges with another branch. In other words, one of the branches is enabled to activate merged flow. The XOR-Join is denoted by XOR-Join ($X_1, X_2, \ldots, X_n$; Y). In an AND-Join, the branches are executed before merging into a single merged flow. The AND-Join is denoted by AND-Join($X_1, X_2, \ldots, X_n$; Y).

Block 24 represents the conclusion of method 10. In block 24, the results from method 10 are exported. For example, block 24 represents outputting results to a screen, storing results in a database, sending results to a modeling or visualization tool, or transforming results into one of a plurality of formats supported by different process modeling and visualization tools.

As set forth above, embodiments of the present invention are adapted to discover a process without a short interval assumption. In other words, embodiments of the present invention can discover a process without assuming that intervals between tasks are much smaller than the task durations. Understanding the meaning of a "start event" assists in avoiding such an assumption. A start event (e.g., a measured start time) can be either a "scheduling time" or an "activation time."

Scheduling time, in accordance with embodiments of the present invention, includes the time at which a particular task becomes ready for execution. A particular task can become available for execution upon completion of a previous task. For example, in an exemplary process in accordance with present embodiments, a task "get approver decision" in an expense approval process becomes available for processing upon completion of a task "notify approver of work." Further, a scheduling time can mean that an indication is given to proceed to work on an item. For example, a new item can be placed on a user's (e.g., the approver's) work list or on a device's queue.

Activation time, in accordance with embodiments of the present invention, includes the time at which a task is actually started, as opposed to being ready to start. For example, at some later time after receiving an indication to proceed (e.g., provision of a new item on a work list), work actually begins on the referenced item. The time elapsed between when the task is ready (i.e., scheduling time) and when actual work begins on the task (i.e., activation time) can be in the order of hours, days, and so forth. Further, the amount of elapsed time can vary considerably among process executions. For example, in one embodiment, the time elapsed depends on a user's work load, the user's vacation, and so forth. Indeed, a task can be ready for significant periods without actually having any work done towards completion of the task.

Because of long elapsed times between scheduling and completion times of tasks, potential exists for misinterpretation of events. For example, in a process with tasks A, B, and C, many traces can be found with the order of events $A^s A^e B$-$^s B^e C^s C^e$. This arrangement of events can be interpreted various different ways. For example, the events can be interpreted as a sequence including task A followed by task B followed by task C. However, task B can actually have been executed as part of a branch of the process that is parallel to the branch including tasks A and C. This can happen if the executors of task C typically take a long time to activate a task after task A completes, and the execution of task B interleaves in this time window. Alternatively, tasks B and C can be in an AND-Split relative to task A. For example, tasks B and C can be started in parallel and executed in parallel but the executors of task C take a longer time than that taken for task B to be started and completed. Further, the tasks A, B, and C can in fact be in parallel (i.e., no execution dependency between the tasks), and task A executes and completes before task B starts and task B executes and completes before task C starts.

Embodiments of the present invention prevent misinterpretations such as those discussed above. This is achieved in accordance with embodiments of the present invention by employing the procedures of method 10, including those represented by block 22. As set forth above, block 22 includes classifying and ranking arcs, which is discussed in further detail with regard to FIGS. 2 and 3.

Figure 2:
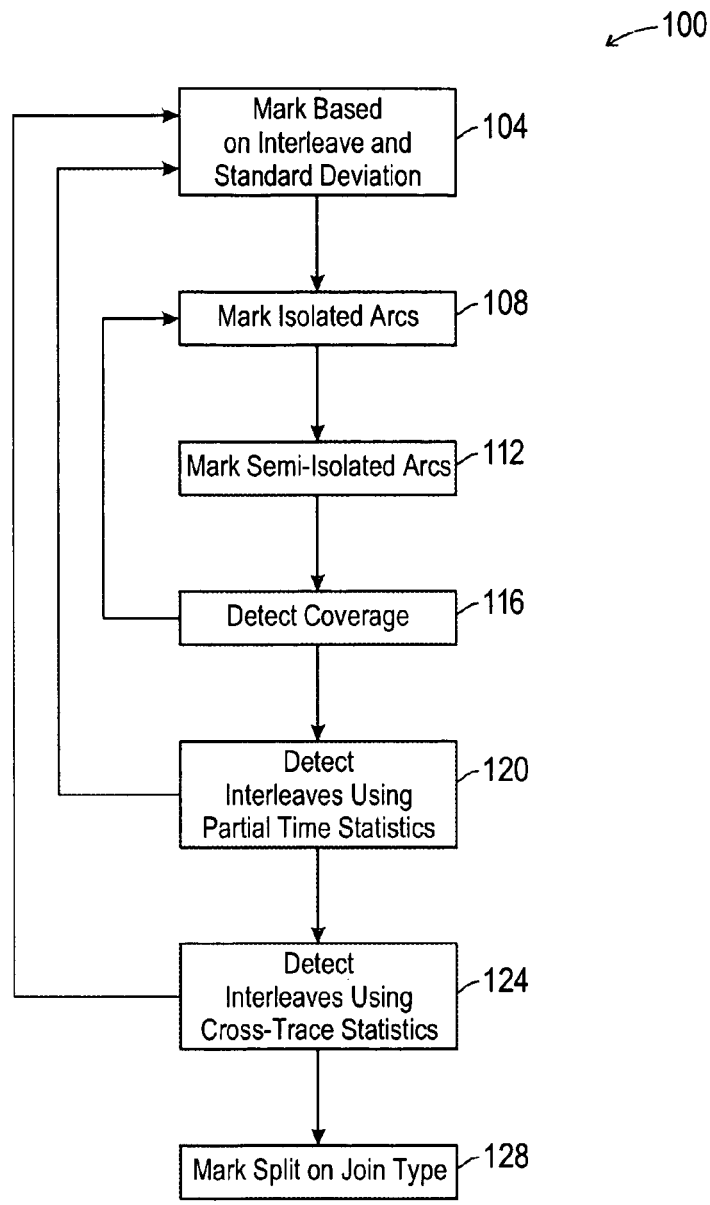
FIG. 2 is a flowchart of a ranking and classification method illustrating one embodiment of the present invention.

FIG. 2 is a flowchart of a ranking and classification method illustrating one embodiment of the present invention. The method is generally referred to by reference number 100. Specifically, method 100 includes ranking and classification procedures that identify which arcs actually correspond to execution dependencies. Additionally, in accordance with embodiments of the present invention, method 100 includes identifying types of relationships.

Block 104 of method 100 represents marking identified arcs based on interleaves and standard deviation. Specifically, block 104 acts to raise the existence probability of each arc having a low number of interleaves and a low standard deviation. When the time difference between a source node and a destination node of an arc is fairly constant across instances and there are no interleaving events, it is assumed in accordance with embodiments of the present invention that the arc actually exists. Accordingly, the existence probability (i.e., the probability that the found arc actually exists) of such an arc is raised in block 104 to a value of $R_{interleaves}$. The defined value of $R_{interleaves}$ depends on the number of interleaves and on the actual value of standard deviation in accordance with embodiments of the present invention. For example, if the number of interleaves is zero and the standard deviation is also zero, then the value of $R_{interleaves}$ is set to 1. It should also be noted that the existence probability is lowered in block 104 when average and standard deviation are high relative to a certain threshold.

Block 108 represents marking isolated arcs. A isolated arc is herein defined as an arc that is the only arc in output from a particular source node and the only arc in input to a particular destination node. When a isolated arc is discovered, it is assumed in accordance with embodiments of the present invention that a dependency between the source node and destination node likely exists. Accordingly, the existence probability for such an arc is set to a value of $R_{isolated}$, which is a user defined value in accordance with embodiments of the present invention. For example, $R_{isolated}$ can be set to 0.9. In addition to raising the existence probability, the probability of an arc being a direct arc (i.e., the probability that the destination node is started as the source node is completed) is raised to a level $R_{sequence-isolated}$, which is a user defined value in accordance with embodiments of the present invention. For example, $R_{sequence-isolated}$ can be set to 0.9. It should be noted that, in one embodiment of the present invention, arcs with an existence probability lower than a certain threshold are excluded from consideration in block 108 and the following steps of method 100.

Block 112 represents marking semi-isolated arcs. Semi-isolated arcs include arcs between a source node and a destination node, wherein either the source node has only one output arc or the destination node has only one input arc. In other words, a semi-isolated arc includes one of the two attributes of a isolated arc. Detected semi-isolated arcs are likely to actually exist in a discovered process. In other words, semi-isolated arcs indicate a high existence probability when they are detected. However, it is inconclusive as to whether such arcs are direct. Accordingly, when semi-isolated arcs are detected in block 112, the corresponding existence probability for the arc is set to $R_{semi-isolated}$ but direct probability is unchanged. Direct probability of an arc AB is the probability of the arc actually existing in the process and of AB being in direct relationship, as explained above. The value of $R_{semi-isolated}$ is determined by a user in accordance with embodiments of the present invention.

Block 116 represents detecting cases of coverage in identified arcs. Specifically, the portion of method 100 represented by block 116 includes detecting arcs that likely do not exist and were detected because of a correspondence between other arcs. For example, if arcs (A,B), and (B,C) actually exist in a process that includes nodes A, B, and C, an additional arc (A,C) can be detected. However, it is not likely that the arc (A,C) actually exists. Indeed, it is likely that the arc (A,C) is a faulty detection based on the relationship between existing arcs (A,B) and (B,C). In other words, arc (A,C) is detected because task A starts and completes before task C starts. However, this can occur because task B separates tasks A and C, as opposed to the actual existence of arc (A,C): Accordingly, block 1-16 determines that if arcs (A,B) and (B,C) exist (i.e., have a existence probability greater than a certain threshold), then the existence probability of (A,C) is lowered. The method 100 then loops back to block 108 and repeats until information relating to the existence of identified arcs is unchanged or substantially unchanged (i.e., within a pre-defined range of error). Arcs with an existence probability around 50% (i.e., undecided) are resolved using weaker criteria (i.e., assumptions that are less likely to correspond to reality).

Block 120 represents detecting interleaves using partial time statistics. Partial time statistics include using time differences among events to determine if arcs exist or not. In one embodiment, arc instances having an interval below a designated threshold are used in performance of this statistical calculation. For example, arcs that correspond to intervals that are on average below 5 seconds can be considered as indicative of a relationship between the source and destination nodes of the arc. Thus, the existence probability can be raised by 10%, for example. Additionally, as noted above, in one embodiment, calculations in block 120 are limited to arcs with existence probabilities around 50%. After performing the calculations of block 120, the method 100 loops back to block 104 and repeats until information relating to the existence of identified arcs is unchanged or substantially unchanged.

Specifically, in the portion of method 100 represented by block 120, statistics for arc interval times are computed. This includes, for example, the calculation of statistics relating to averages and standard deviations of arc information. The calculations of block 120 assist in further establishing an accurate existence probability of the analyzed arcs based on analysis. The principle behind this analysis is that even if on aggregate the average interval and standard deviation are large (e.g., above a designated threshold or beyond a designated range), if in a significant number of cases (e.g., 10% or a user defined percentage) the average and standard deviation are very low (e.g., below a designated threshold or within a designated range), it is likely that the arc corresponds to an actual dependency. It is unlikely that the interval between arcs will be very short a significant number of times by chance.

Block 124 represents detecting interleaves using cross-trace statistics. Specifically, block 124 includes analyzing data across traces, rather than analyzing the traces separately. By observing traces, it can be determined, at specific times, when outstanding instances of nodes (e.g., tasks that have been scheduled or activated and are incomplete) are present. This observation can indicate that there is a shorter time distance between starting a particular task and completion of a previous task. Indeed, assuming there are no outstanding instances for a task N, it is reasonable to assume on average that the executors of task N are idle and can be better enabled to handle work when scheduled. It should be noted that for arcs with an existence probability around 50% (i.e., non-conclusive), time statistics are computed taking into account arc instances in cases when the task queue for the destination task is empty. Further, after block 124, the method 100 loops back to block 104 and repeats until information relating to the existence of identified arcs is unchanged or substantially unchanged.

After existence probabilities have been marked, arc types are determined for the arcs that exist (i.e., arcs that have an existence probability above a designated threshold). Accordingly, block 128 represents marking split and join type process structures in accordance with embodiments of the present invention. Specifically, in block 128, arcs are marked as being an AND-Split, an XOR-Split, an AND-Join, or an XOR-Join. It should be noted that direct arcs or sequences have already been marked by blocks 108 and 112 of method 100. Further details relating to procedures in block 128 are discussed in relation to FIG. 3 and are illustrated therein.

Figure 3:
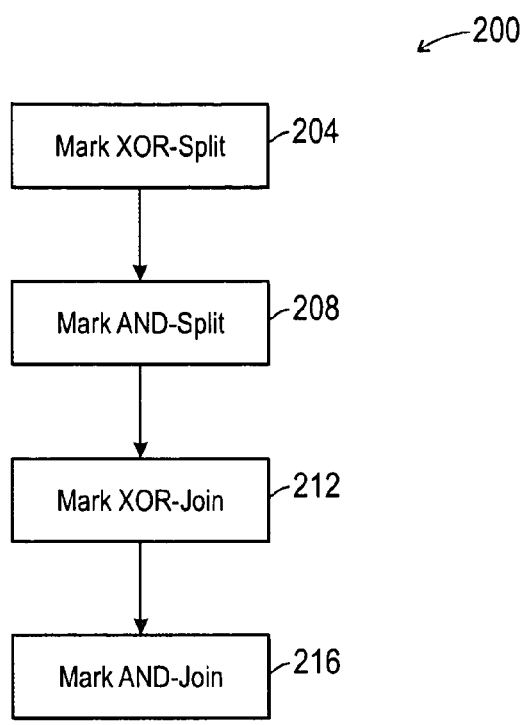
FIG. 3 is a flowchart of a method for marking arc process structure types illustrating one embodiment of the present invention.

FIG. 3 is a flowchart of a method for marking arc process structure types illustrating one embodiment of the present invention. The method is generally referred to by reference number 200. Specifically, the method 200 includes marking XOR-Split arc types (block 204), marking AND-Split arc types (block 208), marking XOR-Join arc types (block 212), and marking AND-Join arc types (block 216).

Marking XOR-Split arc types, as illustrated by block 208, includes considering outgoing arcs for particular nodes and changing a related XOR-Split probability for the arcs depending on certain observable characteristics. For example, an existing arc (e.g., arcs having an existence probability greater than a determined threshold) outgoing from a node N that has a number of interleaves less than a threshold is considered in block 208. If the number of interleaves is more than one for the arc, a related XOR-Split probability is raised to a value of $R_{xorsplit}$, which is a user defined value in accordance with embodiments of the present invention. Similarly, block 216 includes analogous logic. However, marking the XOR-Join type arcs in block 216 includes considering arcs input to the node N as opposed to arcs that are output. Further, when the appropriate conditions exist, block 216 includes changing a related XOR-Join probability to a value of $R_{xorjoin}$, rather than changing the XOR-Split probability to $R_{xorsplit}$. The value of $R_{xorjoin}$ is a user defined value in accordance with embodiments of the present invention.

Marking AND-Split arc types, as illustrated by block 212, includes considering outgoing arcs for particular nodes and changing a related AND-Split probability for the arcs depending on certain observable characteristics. An existing arc (e.g., arcs having an existence probability greater than a determined threshold) outgoing from a node N that has a number of interleaves less than a threshold is considered in block 212 if the sum of the number of instances for the arc is within a certain percentage difference of the number of occurrences of node N. Once the arc is considered, its AND-Split probability is set to a value of $R_{andsplit}$. Similarly, block 220 includes analogous logic. However, marking the AND-Join type arcs in block 220 includes considering arcs input to the node N as opposed to arcs that are output. Further, when the appropriate conditions exist, block 220 includes changing a related AND-Join probability to a value of $R_{andjoin}$, rather than changing the XOR-Split probability to $R_{andsplit}$. The value of $R_{andjoin}$ a user defined value in accordance with $R_{andjoin}$ is embodiments of the present invention.

In accordance with embodiments of the present invention, results are typically obtained upon completion of method 200, which is generally represented by block 128 in FIG. 2. These results are then outputted, as illustrated by block 24 in FIG. 1, on a screen, to a database, or in other formats. In one embodiment of the present invention, the results include existence probability and ranking for identified arcs. These results can be filtered in accordance with embodiments of the present invention such that further consideration is limited to arcs having certain characteristics. For example, a user can set a threshold to filter arcs such that arcs marked with a type attribute and with a type probability (e.g., XOR-split probability) above the threshold are considered.

Figure 4:
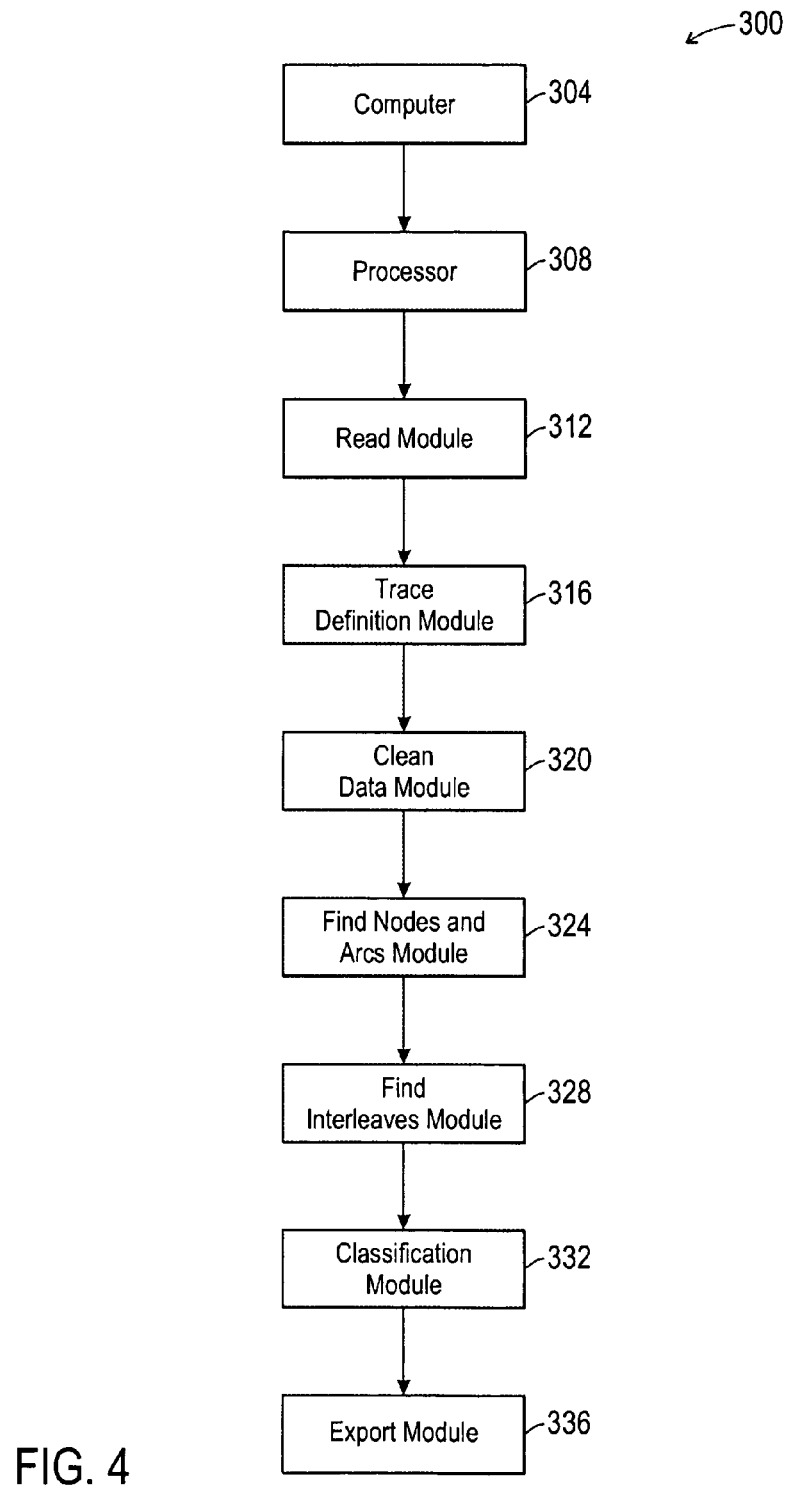
FIG. 4 is a block diagram of a computer system for process discovery illustrating one embodiment of the present invention.

FIG. 4 is a block diagram illustrating one embodiment of a computer system 300 for process discovery. Specifically, block 304 of FIG. 4 represents a computer. The computer (block 304) comprises or interacts with a processor 308 and modules represented by blocks 312, 316, 320, 324, 328, 332, and 336, thus allowing for application of the methods presented in FIGS. 1-3. The processor 308 can be any one of a number of suitable processors, including but not limited to a Pentium processor or an Athlon processor. In one embodiment, the processor 308 is located within the computer 304.

The modules (blocks 312, 316, 320, 324, 328, 332, and 336) are hardware, software, or some combination of hardware and software. Additionally, an individual module does not necessarily solely comprise each module function as illustrated. In other words, the modules shown in the blocks 312, 316, 320, 324, 328, 332, and 336 are merely one example and other embodiments can be envisaged wherein the functions are split up differently or wherein some modules are not included or other modules are included. The illustrated modules (blocks 312, 316, 320, 324, 328, 332, and 336) comprise a read module (block 312) that reads process data relating to certain steps or tasks of a process, a trace definition module (block 316) that defines a trace, a clean data module (block 320) that reorganizes and revises the trace, a find nodes and arcs module (block 324) that detects nodes and arcs, a find interleaves module (block 328) that identifies interleaves, a classification module (block 332) that classifies and ranks identified arcs, and an export module (336) that outputs results. In this embodiment and in other envisaged computer system embodiments, a user incorporates the functionality of the computer (block 304) to enhance the performance of the process discovery technique previously discussed. For example, the computer (block 304) can discover process models, as described above, by utilizing the modules represented by blocks 312, 316, 320, 324, 328, 332, and 336.

Figure 5:
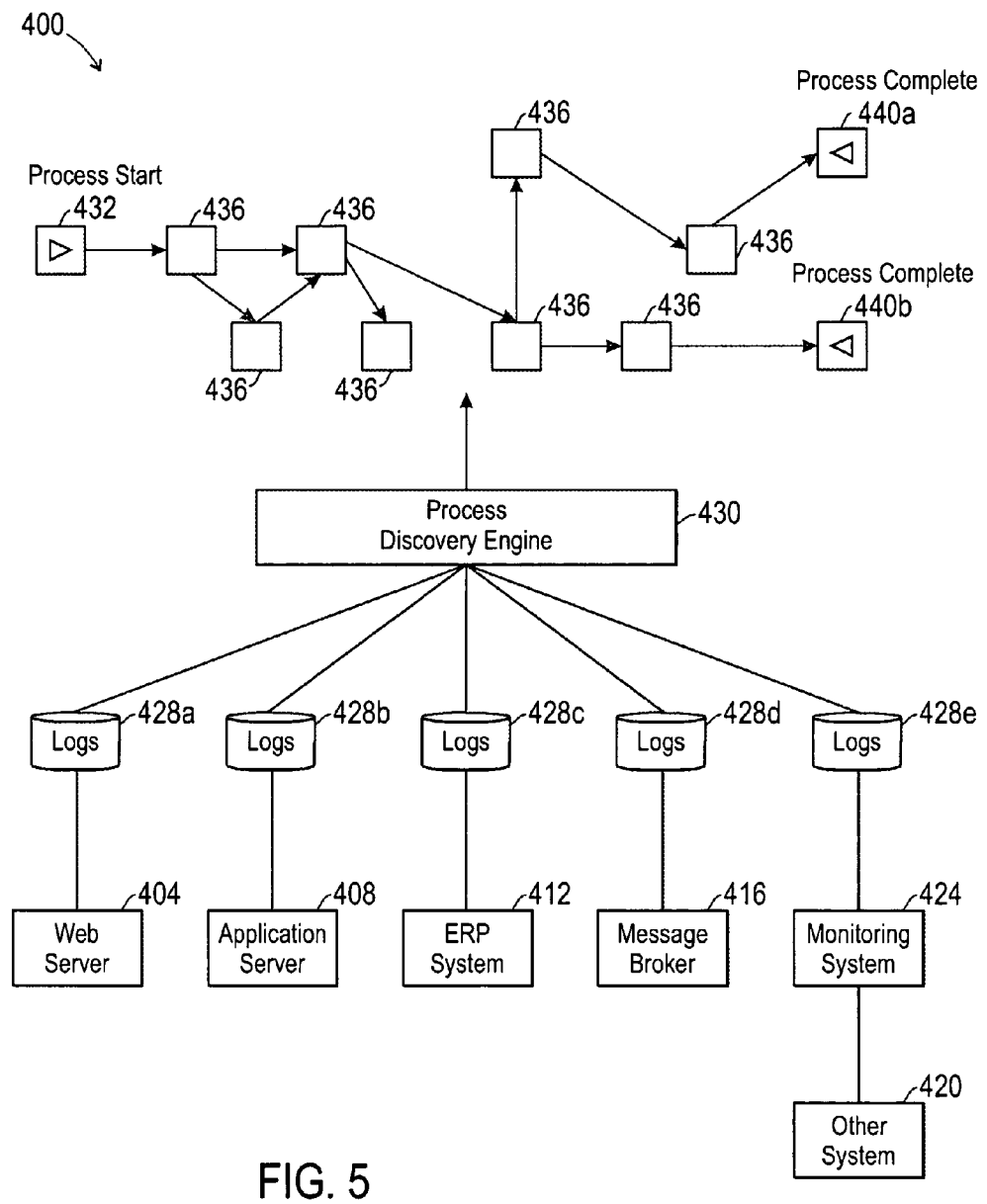
FIG. 5 is a block diagram illustrating an example of a process discovery system.

FIG. 5 is a block diagram illustrating one embodiment of a process discovery system 400. In one embodiment, the process discovery system 400 comprises one or more applications, such as web servers 404, application servers 408, ERP systems 412, message brokers 416, or other systems 420 with monitoring systems 424. As described above, the applications 404, 408, 412, 416 and 420 store a series of events in log files 428a, 428b, 428c, 428d, and 428e. In one embodiment, the events stored in the log files 428a, 428b, 428c, 428d, and 428e are related to one or more business processes. In one embodiment, a process discovery engine 430, such as the computer system 300 described above, reads data from the log files 428a, 428b, 428c, 428d, and 428e, defines one or more traces based on the data, cleans the data, identifies nodes and arcs, finds interleaves, classifies and ranks arcs, and exports results. For example, FIG. 4 illustrates a process start 432, a plurality of tasks 436, and two process completes 440a and 440b. The arrows between the events 436 illustrate the plurality of traces.

While the invention can be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for process discovery, comprising:
defining a trace using process data, the trace comprising a collection of events;
analyzing the trace to detect nodes and arcs between the nodes using relationships between the collection of events; and
detecting interleaving between the nodes using a process discovery engine that analyzes relationships between the collection of events and the detected nodes and arcs.

2. The method of claim 1, further comprising classifying and ranking the detected arcs according to characteristics of the arcs, the characteristics of the arcs determined using the detected interleaving.

3. The method of claim 1, further comprising probabilistically eliminating detected arcs that are without correspondence to actual dependencies.

4. The method of claim 3, wherein probabilistically eliminating detected arcs includes iteratively eliminating detected arcs that are without correspondence to actual dependencies.

5. The method of claim 1, further comprising removing spurious data from the process data.

6. The method of claim 1, wherein the collection of events includes events that correspond to a start time and an end time for a one of the nodes in a particular process execution.

7. The method of claim 1, wherein detecting arcs includes identifying a relationship between a first node and a second node if in a certain percentage of traces both nodes are present when one of the two nodes is present and completion of the first node precedes the start of the second node.

8. The method of claim 1, further comprising assigning a one of the detected arcs an existence probability.

9. The method of claim 1, wherein detecting arcs includes retrieving arc information comprising an average and standard deviation relating to a time difference between an end node event and a start node event.

10. The method of claim 1, wherein detecting interleaving includes performing statistical calculations on the trace.

11. The method of claim 1, wherein a time between a first and second node execution is shorter than a node execution time of the first node.

12. The method of claim 1, wherein a time between a first and second node execution is longer than a node execution time of the first node.

13. A method for process discovery, comprising:
creating a trace from extracted data by ordering events corresponding to the data;
detecting arcs between tasks using occurrences of the tasks and relationships between corresponding events;
detecting interleaving between the tasks using a process discovery engine that analyzes relationships between the events and the detected arcs; and
classifying the detected arcs according to structures of the tasks relating to the arcs.

14. The method of claim 13, further comprising ranking the detected arcs according to classification.

15. The method of claim 13, wherein the events include a start time and an end time.

16. The method of claim 13, wherein detecting interleaving includes identifying occurrence of an event between a first task and a second task.

17. The method of claim 13, wherein creating the traces includes removing spurious data.

18. The method of claim 17, wherein removing spurious data includes removing outlying data.

19. The method of claim 13, wherein detecting arcs includes comparing information between the trace and a different trace of a same process.

20. The method of claim 13, wherein detecting arcs includes identifying a relationship between a first task and a second task if in a certain percentage of traces both tasks are present when one of the two tasks is present and completion of the first task precedes the start of the second task.

21. The method of claim 13, further comprising assigning a one of the detected arcs an existence probability.

22. The method of claim 13, wherein detecting arcs includes retrieving arc information comprising an average and standard deviation relating to a time difference between an end event of a task and a start event of a task.

23. A system for process discovery, comprising:
a processor that is configured to execute application instructions;
a computer-usable medium that stores modules that include the application instructions, the modules comprising:
a trace definition module adapted to define a trace using process data, the trace comprising a collection of events;
a detection module adapted to analyze the trace to detect nodes and arcs between the nodes using relationships between the collection of events; and
an interleaving module adapted to detect interleaves between the nodes by analyzing relationships between the collection of events and the detected nodes and arcs.

24. The system of claim 23, further comprising a classification and ranking module adapted to classify and rank the detected arcs according to characteristics of the arcs, the characteristics of the arcs determined using the detected interleaving.

25. The system of claim 23, further comprising a reading module adapted to read the process data from a data source.

26. The system of claim 23, further comprising a cleaning module adapted to remove spurious data from the process data.

27. The system of claim 23, wherein the trace definition module is adapted to define the trace using events that correspond to a start time and an end time for a one of the nodes in a particular process execution.

28. The system of claim 23, further comprising an existence module adapted to assign a one of the detected arcs an existence probability.

29. The system of claim 23, wherein the detection module includes a relationship component adapted to identify a relationship between a first node and a second node if in a certain percentage of traces both nodes are present when one of the two nodes is present and completion of the first node precedes the start of the second node.

30. A system for process discovery, comprising:
a process discovery engine comprising:
means for defining a trace using process data, the trace comprising a collection of events;
means for analyzing the trace to detect nodes and arcs between the nodes using relationships between the collection of events;
means for detecting interleaving between the nodes by analyzing relationships between the collection of events and the detected nodes and arcs; and
means for classifying and ranking the detected arcs according to characteristics of the arcs, the characteristics of the arcs determined using the detected interleaving.

31. Application instructions on a non-transitory computer-usable medium where the instructions, when executed, effect process discovery, comprising:
instructions adapted to define a trace using process data, the trace comprising a collection of events;
instructions adapted to analyze the trace to detect nodes and arcs between the nodes using relationships between the collection of events; and
instructions adapted to detect interleaves between the nodes by analyzing relationships between the collection of events and the detected nodes and arcs.

32. The application instructions of claim 31, further comprising instructions adapted to classify and rank the detected arcs according to characteristics of the arcs, the characteristics of the arcs determined using the detected interleaving.

33. The application instructions of claim 32, further comprising instructions adapted remove spurious data from the process data.

34. The application instructions of claim 32, further comprising instructions adapted to assign a one of the detected arcs an existence probability.

35. A method for process discovery, comprising:
reading process data from a data source;
cleaning the process data by removing spurious data, wherein spurious data includes either or both of data relating to processes for which data is incomplete and data which is erroneous;
defining a trace using the process data, the trace comprising a collection of events, wherein events includes events that correspond to a start time and an end time for a one of the nodes in a particular process execution;
analyzing the trace to detect nodes and arcs between the nodes using relationships between the collection of events, wherein detecting arcs includes identifying a relationship between a first node and a second node if in a certain percentage of traces both nodes are present when one of the two nodes is present and completion of the first node precedes the start of the second node;
detecting interleaving between the nodes using a process discovery engine that performs statistical calculations on the trace to analyze relationships between the collection of events and the detected nodes and arcs;
assigning each of the detected arcs an existence probability; and classifying and ranking the detected arcs according to characteristics of the arcs, the characteristics including existence probability.

\* \* \* \* \*

UNITED STATES PATENT AND TRADEMARK OFFICE
CERTIFICATE OF CORRECTION

| | |
|---|---|
| PATENT NO. | : 8,423,396 B1 |
| APPLICATION NO. | : 11/116862 |
| DATED | : April 16, 2013 |
| INVENTOR(S) | : Maria Guadalupe Castellanos et al. |

It is certified that error appears in the above-identified patent and that said Letters Patent is hereby corrected as shown below:

In the Claims:

In column 12, line 40, in Claim 33, delete "adapted" and insert -- adapted to --, therefor.

Signed and Sealed this
Twentieth Day of August, 2013

Teresa Stanek Rea
*Acting Director of the United States Patent and Trademark Office*